Patented Mar. 23, 1943

2,314,466

UNITED STATES PATENT OFFICE 2,314,466

INHIBITOR FOR CHEMICAL DETERIORATION

Herman L. Thwaites, Clark Township, Union County, N. J., assignor, by mesne assignments, to Jasco, Incorporated, a corporation of Louisiana No Drawing. Application November 30, 1939, Serial No. 306,903

7 Claims. (Cl. 260—669)

This invention relates to means for reducing the deterioration of unsaturated organic compounds and certain derivatives, and especially those compounds which contain terminal methylene-type structures. It relates particularly to the incorporation in such compounds of materials in small amounts to reduce the tendency of relatively simple compounds to polymerize and to reduce the tendency of polymerized compounds to break down.

The present invention is based upon the fact that compounds containing olefinic linkages are usually chemically unstable at atmospheric temperatures, and especially in the presence of light at higher temperatures. This instability is evident in the simple olefinic compounds and in the polymerized unsaturated compounds containing olefinic structures. Hence the invention is concerned with the improvement in chemical stability of materials so widely different in physical properties as the liquid olefin hydrocarbons and the various commercial materials such as the vinyl, isobutylene and isoprene type resins, varnishes and coating compositions and even many type copolymer compositions. In general, unsaturated compounds having terminal methylene structures and their polymers and particularly such hydrocarbon compounds and their polymers and copolymers are stabilized by the compounds employed in the present invention. By the term, terminal methylene structure, is meant for the purposes of description in this invention the presence in the molecular structure of the unsaturated grouping, $R_1=CR_2R_3$, in which $R_1$ is the major portion of the molecule predominantly organic in character, preferably hydrocarbon or substituted hydrocarbon, and $R_2$ and $R_3$ are either hydrogen or short alkyl radicals, that is, radicals consisting of not more than three carbon atoms each. Increasing in these materials the resistance to deterioration by the addition of the stabilizing agents employed in this invention eliminates for all practical purposes the development of objectionable discoloration and odors in the compositions so prepared.

The nature of the changes which occur during the deterioration is obscure, but polymerization and depolymerization are evident effects. The reactions which occur are apparently auto-catalytic in character, that is, the products of deterioration act as accelerators or promoters for the production of further quantities of the products of deterioration. Oxidation may, or may not, be a contributing factor in the reactions involved. When oxidation is a factor in the deterioration of the compounds, it is not the main effect. The compounds which function as stabilizers in this invention are apparently negative catalysts in both polymerization and depolymerization reactions.

The addition agents are compounds having an element of sub-group $b$ of the fifth group of the periodic table excluding nitrogen combined directly to a carbon atom of at least one organic radical. Sub-group $b$ of the fifth group of the periodic table excluding nitrogen contains phosphorus, arsenic, antimony and bismuth. These elements may be conveniently classed as the elements of the odd series of group V of the periodic table of atomic weights between 30 and 210. The term "odd series" with reference to the periodic table covers those elements which occur in the odd numbered horizontal series of the periodic system of classification of the elements which starts with hydrogen. Combined with these elements, preferably in the trivalent state, are one or more organic radicals. These radicals may vary in character from having an aliphatic chain to cyclic, alkylated cyclic and heterocyclic structures and these may be substituted by the halide, hydroxyl, mercapto, or amino groups. It is preferable that the compounds contain purely hydrocarbon monovalent radicals. It is of minor significance as to whether the groups are similar or dissimilar in character, or whether one or two are replaced by hydrogen provided the compound itself is sufficiently oil soluble or can be readily dispersed in the materials to which they are added to bring about the desired effects. The radicals which have been found very satisfactory are the alkyl, aryl and alkyl-aryl groups.

The preferable type compounds in the case of the derivatives of phosphorus and arsenic, are related in structure to phosphine and arsine. Similarly, in the case of the derivatives of antimony and bismuth, the preferable type compounds are metallo-organics related in structure to stibine and bismuthine. Examples of the preferred compounds have therefore, the general formula:

$$MR_1R_2R_3$$

in which M may be phosphorus, arsenic, antimony or bismuth, and $R_1$, $R_2$, $R_3$, may be organic radicals, preferably purely hydrocarbon, but one or two may be hydrogen.

The following examples illustrate the stabilizing activity of the compounds of the present invention when incorporated in simple compounds containing terminal methylene-type groups.

EXAMPLE 1

To styrene of boiling point 145° C. was added 0.2% of triphenyl stibine and the mixture was placed in a test tube alongside one containing styrene alone. At the end of 12 days' exposure to sunlight no change was evident in either of the samples. The samples were then transferred to glass petrie dishes 50 mm. in diameter, and exposed to ultra violet light for 17¾ hours at room temperature. The light source was furnished by an 85 watt lamp (G. E.) type H-3, and the samples were placed 14 cm. from the light source. The dishes were filled to a depth of 3 mm. After the exposure the amount of polymer present was determined by the addition of three volumes of 95% ethyl alcohol. The styrene sample was almost entirely insoluble, while that containing 0.2% of triphenyl stibine was soluble except for the precipitation of triphenyl stibine as a thin film on the sides of the dish. The molecular weight of the polymer formed was estimated as being between 15,000 and 30,000.

Example 2

Four 10 cc. (9.074 grams) quantities of styrene were taken. One was left unblended and the others were blended respectively with triphenyl arsine, triphenyl stibine and triphenyl bismuthine in amounts of 0.2% by weight. The four samples were heated over a steam bath for four hours in the absence of light. On removing from the steam bath the samples were diluted with between 3 and 4 times their volume of 95% ethyl alcohol to precipitate the polymeric materials formed. The precipitates formed were washed several times with alcohol by kneading and the materials then dried. The polymers in each case had molecular weights of between 15,000 and 30,000. The amounts formed were as follows:

| Sample | Weight polymer in grams | Weight per cent of polymer formed |
|---|---|---|
| 1. Styrene (fresh distilled) | 1.2 | 13.3 |
| 2. Ditto+0.2% triphenyl-bismuthine | 0.8 | 8.9 |
| 3. Ditto+0.2% triphenyl-stibine | 0.6 | 6.6 |
| 4. Ditto+0.2% triphenyl-arsine | 0.2 | 2.2 |

The effect of the compounds upon the polymerization of isobutylene occurring in the presence of aluminum chloride is shown by the following data.

Example 3

Aluminum chloride was dissolved in methyl chloride to give a 20% solution and added to a flask. The solution was cooled to about −90° F. and isobutylene was bubbled into the solution until all reaction had apparently ceased. Similarly isobutylene was passed into methyl chloride solutions of 20% aluminum chloride to which were also added respectively 0.2% of triphenyl stibine, 0.2% triphenyl arsine and 0.2% triphenyl bismuthine. The results were obtained:

| Addition to mixture | Observations | Approx. mol. wt. |
|---|---|---|
| Blank (isobutylene +AlCl3) | Rapid Polymerization | 120,000 |
| Triphenyl arsine | Slows down reaction very markedly. Small amount of polymer formed. | 3,000 to 4,000 |
| Triphenyl stibine | Slows down the reaction | 10,000 |
| Triphenyl bismuthine | Does not slow down the reaction but polymer formed is of adhesive nature. | 25,000 |

It is apparent from Examples 2 and 3 that the order of decreasing inhibitory effectiveness in terms of the non-organic portion is arsenic, antimony and bismuth.

Example 4

This example is presented to demonstrate again the controlling effect of triphenyl stibine and triphenyl bismuthine upon the polymerization of compounds containing the methylene type structure. Isobutylene in this example was polymerized at −105° F. in the presence of boron fluoride as a catalyst.

| Inhibitor | Per cent conc. | Molecular weight of polymer formed |
|---|---|---|
| None | 0.0 | 96,000 |
| Triphenyl stibine | 1.0 | 20,000 |
| Do | 0.1 | 39,000 |
| Do | 0.01 | 74,000 |
| Do | 0.001 | 91,500 |
| Triphenyl bismuthine | 1.0 | 84,000 |
| Do | 0.1 | 91,500 |

Example 5

In finishing polybutene compositions it is necessary to remove any attendant light hydrocarbons, moisture or catalyst. This may be accomplished by milling or kneading at temperatures of 300–400° F. Polybutene materials, however, when milled at elevated temperatures for prolonged periods deteriorate forming compounds of lower molecular weight. This breakdown of polybutenes occurs during milling. The deterioration may be inhibited by the addition of the inhibitors of this invention. In a test conducted with a mill employing two high pressure steam heated rollers of different diameter, revolving in opposite directions, polybutene materials with and without admixture with triphenyl stibine were treated so as to give to the materials a combined squeezing and shearing effect at an elevated temperature. The following data were obtained:

*Hot milling of polybutenes at 338° F.*

| Time, minutes | Polybutene mol. wt.×10³ | Polybutene +0.1% triphenyl stibine mol. wt.×10³ |
|---|---|---|
| Initial | 80.5 | 78.0 |
| 5 mins | 72.0 | 76.5 |
| 10 mins | 73.5 | 73.5 |
| 20 mins | 42.5 | 73.5 |
| 30 mins | 37.5 | 75.5 |
| 40 mins |  | 72.5 |
| 50 mins |  | 76.5 |
| 60 mins |  | 71.0 |
| 90 mins |  | 72 |
| 105 mins |  | 71 |

Although it is usual to incorporate the inhibitors directly in the materials it is of advantage sometimes to dissolve the compounds in a suitable solvent and add in this manner either to incorporate in the mass or superficially to protect the surface.

Compositions in which the compounds may also be employed to advantage are the synthetic rubber-like materials formed by polymerization, as for example, of butadiene, or 2-chlorobutadiene, or by copolymerization, as for example, of styrene and certain diolefins, or even of butadiene and acrylonitrile. Copolymers which are obtained by reacting a low molecular weight olefin, preferably an iso-olefin, such as isobutylene, with low molecular weight diolefins, preferably a conjugated diolefin, such as butadiene, isoprene, dimethyl butadiene etc., may likewise be improved by treatment with the compounds of this invention. As such, these compounds of the invention are applicable to the prevention of age deterioration and flex-cracking of the copolymers of isoolefins and diolefins having terminal methylene structures, such as, for example, the copolymers formed by reacting isobutylene and butadiene at temperatures below 32° F. and preferably at temperatures between —110° F. and —150° F., or even as low as —180° F. in the presence of a suitable metal halide catalyst such as aluminum chloride dissolved in methyl or ethyl chloride. Any of these rubberlike compounds may or may not, be admixed with fillers, pigments, curing agents and the like.

As many widely distinct embodiments of this invention may be made without departing from the spirit and scope thereof, it is to be understood that I do not limit myself to the specific embodiments therein.

I claim:

1. The process of inhibiting the polymerization and condensation of styrene which comprises adding to styrene a small amount of triphenyl arsine.

2. A stabilized organic composition containing an organic compound having the vinyl group and a small amount of triphenyl arsine.

3. Styrene stabilized by the addition of a small amount of triphenyl arsine.

4. The process of inhibiting the polymerization and condensation of an organic compound having the vinyl group which comprises adding to said vinyl compound a small amount of a triphenyl compound of an element of the odd series of group V of the periodic table of atomic weight between 30 and 210.

5. A stabilized organic composition containing an organic compound having the vinyl group and a small amount of a triphenyl compound of an element of the odd series of group V of the periodic table of atomic weight between 30 and 210.

6. A stabilized organic composition containing an organic compound having a vinyl group and a small amount of triphenyl stibine.

7. A stabilized organic composition containing an organic compound having a vinyl group and a small amount of triphenyl bismuthine.

HERMAN L. THWAITES.